(12) United States Patent
McCarthy et al.

(10) Patent No.: US 11,388,074 B2
(45) Date of Patent: Jul. 12, 2022

(54) TECHNOLOGIES FOR PERFORMANCE MONITORING AND MANAGEMENT WITH EMPTY POLLING

(71) Applicant: Intel Corporation, Santa Clara, CA (US)

(72) Inventors: Peter McCarthy, Ennis (IE); Chris MacNamara, Limerick (IE); John Browne, Limerick (IE); Liang J. Ma, Shannon (IE); Liam Day, Limerick (IE)

(73) Assignee: Intel Corporation, Santa Clara ( * ) Notice: Subject to any disclaimer, the term of this patent is extended or adjusted under 35 U.S.C. 154(b) by 442 days.

(21) Appl. No.: 16/381,237

(22) Filed: Apr. 11, 2019

(65) Prior Publication Data
US 2019/0238442 A1 Aug. 1, 2019

Related U.S. Application Data

(60) Provisional application No. 62/656,628, filed on Apr. 12, 2018.

(51) Int. Cl.
| | | |
|---|---|---|
| *G06F 1/32* | (2019.01) | |
| *H04L 43/00* | (2022.01) | |
| *H04L 43/10* | (2022.01) | |
| *H04L 41/0833* | (2022.01) | |
| *H04L 43/022* | (2022.01) | |

(Continued)

(52) U.S. Cl.
CPC ............ *H04L 43/10* (2013.01); *G06F 1/3209* (2013.01); *H04L 41/0833* (2013.01); *H04L 43/022* (2013.01); *H04L 43/16* (2013.01)

(58) Field of Classification Search
None
See application file for complete search history.

(56) References Cited

U.S. PATENT DOCUMENTS

| | | | | |
|---|---|---|---|---|
| 2008/0162964 A1* | 7/2008 | Dahlen | ................ | G06F 1/3203 713/320 |
| 2013/0227562 A1* | 8/2013 | Tsirkin | ................ | G06F 9/5088 718/1 |

(Continued)

FOREIGN PATENT DOCUMENTS

EP 2479925 A1 * 7/2012 ............. H04L 12/12

*Primary Examiner* — Fahmida Rahman
(74) *Attorney, Agent, or Firm* — Hanley, Flight & Zimmerman, LLC

(57) ABSTRACT

Technologies for performance monitoring include a computing device having multiple processor cores. The computing device performs a training workload with a processor core by continuously polling an empty input queue. The computing device determines empty polling thresholds based on the empty polling workload. The computing device performs a packet processing workload with one or more processor cores by continuously polling input queues associated with network traffic. The computing device compares a measured number of empty polls performed by the packet processing workload against the empty polling thresholds. The computing device configures power management of one or more processor cores in response to the comparison. The computing device may determine empty polling trends and compare the measured number of empty polls and the empty polling trends to the empty polling thresholds. Other embodiments are described and claimed.

22 Claims, 5 Drawing Sheets

(51) Int. Cl.
*H04L 43/16* (2022.01)
*G06F 1/3209* (2019.01)

(56) References Cited

U.S. PATENT DOCUMENTS

2015/0198992 A1* 7/2015 Kumar .................. G06F 1/3243
 713/320
2017/0149604 A1* 5/2017 Burford ................ H04L 41/142

* cited by examiner

TECHNOLOGIES FOR PERFORMANCE MONITORING AND MANAGEMENT WITH EMPTY POLLING

CROSS-REFERENCE TO RELATED APPLICATION

The present application claims the benefit of U.S. Provisional Patent Application No. 62/656,628, filed Apr. 12, 2018.

BACKGROUND

Current computing devices may perform advanced packet processing workloads and other network tasks. Certain packet processing workloads, such as processing with the Intel® Data Plane Development Kit (DPDK) or projects that consume DPDK (e.g., Storage Performance Development Kit (SPDK), Open vSwitch, etc.), may include continuous polling by one or more processor cores. For those workloads, the processor cores performing continuous polling may always appear to be fully loaded (i.e., 100% busy), independent of how much packet processing work those cores are doing.

Previous systems have attempted to determine how many cycles are consumed per core based on the incoming work to the core. Based on the incoming work and the estimated cost for packet processing (e.g., calculated processor cycles for the load on a processor core), the processor may call sleep( ) for a certain time. Calling sleep( ) is somewhat speculative, for example a burst of traffic may arrive and packet loss may be observed. Additionally, actual workload is variable. For example, processing cost (e.g., processor cycles) may vary based on the type of packet or type of work. As another example, forwarding a packet that requires decrypt prior to forwarding may require more processing then a plaintext frame. As yet another example, depending on the algorithm, the cycle cost may be greater for some algorithms, such as cryptographic algorithms. To simplify these complex calculations, current solutions may use the cost of the heaviest frames and use the amount of that work to make a determination. When only a few frames are heavy, this estimation may be over conservative.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
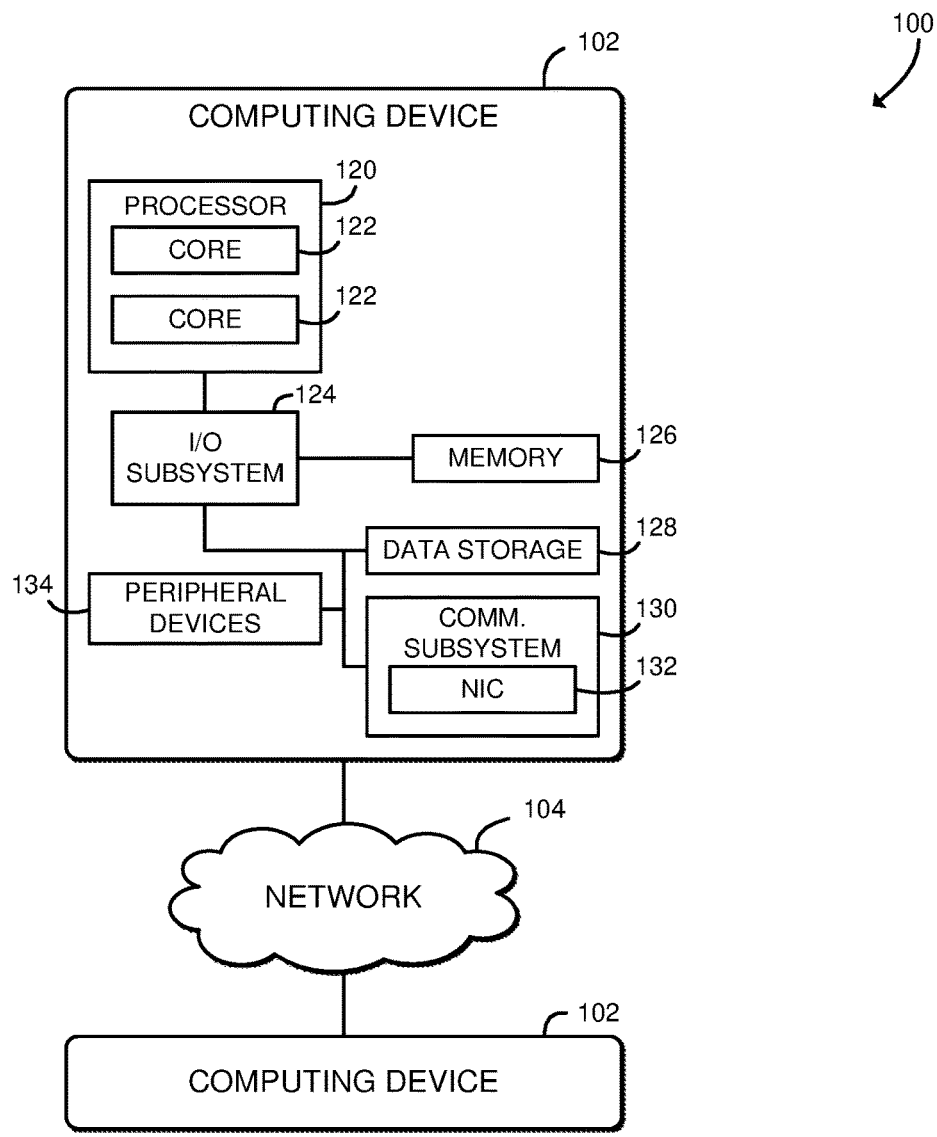
FIG. 1 is a simplified block diagram of at least one embodiment of a system for power and performance management based on empty polling.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for power and performance management based on empty polling includes multiple computing devices 102 in communication over a network 104. In use, as described further below, the computing device 102 may perform a workload with continuous polling, such as DPDK. The computing device 102 uses the number of empty polls executed on a queue per interval to determine the load on a core. The queue may be a queue from a NIC device or may be a software queue (e.g., between cores and not tied to a device). Based on the load on the core determined with empty polling, the computing device 102 may perform power management operations such as processor frequency scaling. Thus, the system 100 as disclosed herein may allow a computing device 102 to determine how busy a core is by measuring empty polling, without requiring complicated attempts to measure or estimate the type of work that is on-going. Accordingly, the computing device 102 may perform energy saving and frequency scaling, for example by turning down power consumption as the system is in a medium, low, or idle processing state. Additionally, the computing device 102 may predict in advance of hitting a load condition that the system is about to become loaded or overloaded. Thus, the system 100 may allow administrators or other users to identify the real load on a computing device 102 and determine whether the computing device 102 is in overload or idle, even for workloads that perform continuous polling. Based on that information, users may perform interventions and mitigate overload conditions. Additionally, the system 100 may improve energy consumption by reducing idle and busy polling performed without power management. For example, in a test computing device 102, significant platform power draw saving was measured for frequency scaling as described herein on 22 out of 56 processor cores.

Each computing device 102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively include a processor 120, an input/output subsystem 124, a memory 126, a data storage device 128, and a communication subsystem 130, and/or other components and devices commonly found in a server or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. Illustratively, the processor 120 is a multi-core processor 120 having two processor cores 122, each of which is an independent, general-purpose processing unit capable of executing programmed instructions. For example, each processor core 122 may execute instructions from a general-purpose instruction set architecture (ISA) such as IA-32 or Intel 64. Of course, in other embodiments the processor 120 may be embodied as a single or multi-core processor(s), digital signal processor, microcontroller, or other processor or processing/controlling circuit. For example, in some embodiments, the processor 120 may be embodied as a high core count processor that includes twenty-eight processor cores, fifty-six processor cores, or a different number. Additionally, although illustrated as including a single processor 120, in some embodiments, each computing device 102 may be embodied as a multi-socket server with multiple processors 120.

Similarly, the memory 126 may be embodied as any type of volatile or non-volatile memory or data storage capable of performing the functions described herein. In operation, the memory 126 may store various data and software used during operation of the computing device 102 such as operating systems, applications, programs, libraries, and drivers.

As shown, the processor 120 is communicatively coupled to the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 126 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 126, and/or other components of the computing device 102, on a single integrated circuit chip.

The data storage device 128 may be embodied as any type of device or devices configured for short-term or long-term storage of data such as, for example, memory devices and circuits, memory cards, hard disk drives, solid-state drives, non-volatile flash memory, or other data storage devices. The computing device 102 also includes the communication subsystem 130, which may be embodied as any communication circuit, device, or collection thereof, capable of enabling communications between the computing device 102 and other remote devices over the computer network 104. For example, the communication subsystem 130 may be embodied as or otherwise include a network interface controller (NIC) 132 for sending and/or receiving network data with remote devices. The communication subsystem 130 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication As shown, the computing device 102 may further include one or more peripheral devices 134. The peripheral devices 134 may include any number of additional input/output devices, interface devices, hardware accelerators, and/or other peripheral devices. For example, in some embodiments, the peripheral devices 134 may include a touch screen, graphics circuitry, a graphical processing unit (GPU) and/or processor graphics, an audio device, a microphone, a camera, a keyboard, a mouse, a network interface, and/or other input/output devices, endpoints, interface devices, and/or peripheral devices.

The computing devices 102 may be configured to transmit and receive data with each other and/or other devices of the system 100 over the network 104. The network 104 may be embodied as any number of various wired and/or wireless networks, or hybrids or combinations thereof. For example, the network 104 may be embodied as, or otherwise include, a wired or wireless local area network (LAN), and/or a wired or wireless wide area network (WAN). As such, the network 104 may include any number of additional devices, such as additional computers, routers, and switches, to facilitate communications among the devices of the system 100.

Figure 2:
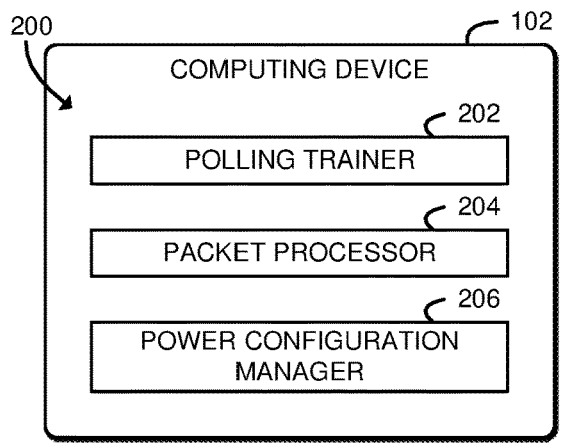
FIG. 2 is a simplified block diagram of at least one embodiment of an environment of a computing device of FIG. 1.

Referring now to FIG. 2, in an illustrative embodiment, the computing device 102 establishes an environment 200 during operation. The illustrative environment 200 includes a polling trainer 202, a packet processor 204, and a power configuration manager 206. As shown, the various components of the environment 200 may be embodied as hardware, firmware, software, or a combination thereof. As such, in some embodiments, one or more of the components of the environment 200 may be embodied as circuitry or collection of electrical devices (e.g., polling trainer circuitry 202, packet processor circuitry 204, and/or power configuration manager circuitry 206). It should be appreciated that, in such embodiments, one or more of the polling trainer circuitry 202, the packet processor circuitry 204, and/or the power configuration manager circuitry 206 may form a portion of the processor 120, the I/O subsystem 124, the NIC 132, and/or other components of the computing device 102. For example, in some embodiments the polling trainer 202 and/or the power configuration manager 206 may be implemented as one or more logic blocks in hardware, which may provide for fast reactions down to microsecond or nanosecond reaction times, which may allow the computing device 102 to overcome micro bursts of traffic. Additionally, in some embodiments, one or more of the illustrative components may form a portion of another component and/or one or more of the illustrative components may be independent of one another.

The polling trainer 202 is configured to perform an empty polling training workload by one or more processor cores 122. The empty polling training workload includes continuously polling an empty input queue as part of a packet processing workload and measuring the number of empty polls performed per sampling interval on the empty input queue. The polling trainer 202 is further configured to determine one or more empty polling thresholds based on performing the empty polling training workload. Each of the empty polling thresholds may be associated with a level of packet processing load (e.g., low load, medium load, high load, overload, etc.).

The packet processor 204 is configured to perform a packet processing workload on network traffic with one or more processor cores 122 after determining the empty polling thresholds. Performing the packet processing workload includes continuously polling an input queue associated with the network traffic and measuring the number of empty polls per sampling interval performed on that input queue.

The power configuration manager 206 is configured to compare the measured number of empty polls performed by the packet processing workload to the one or more empty polling thresholds. Comparing the number of empty polls to the empty polling thresholds may include determining whether the number of empty polls is greater than or less than one or more of the empty polling thresholds. The power configuration manager 206 may be further configured to determine an empty polling trend in response to measuring the number of empty polls and compare the number of empty polls to the empty polling thresholds while considering the empty polling trend. For example, comparing the number of empty polls to the empty polling thresholds may include determining whether the number of empty polls is trending toward a threshold or other value (e.g., zero). The power configuration manager 206 is further configured to configure power management of the processor cores 122 based on the comparison of the number of empty polls to the empty polling thresholds. Configuring the power management may include increasing a performance level when load is high (e.g., increasing a processor power state (increasing a performance level) or activating a core 122) or decreasing a performance level when load is low (e.g., decreasing a processor power state or deactivating a core 122). Configuring the power management may also include scheduling an additional workload on the processor cores 122 when load is low.

Figure 3:
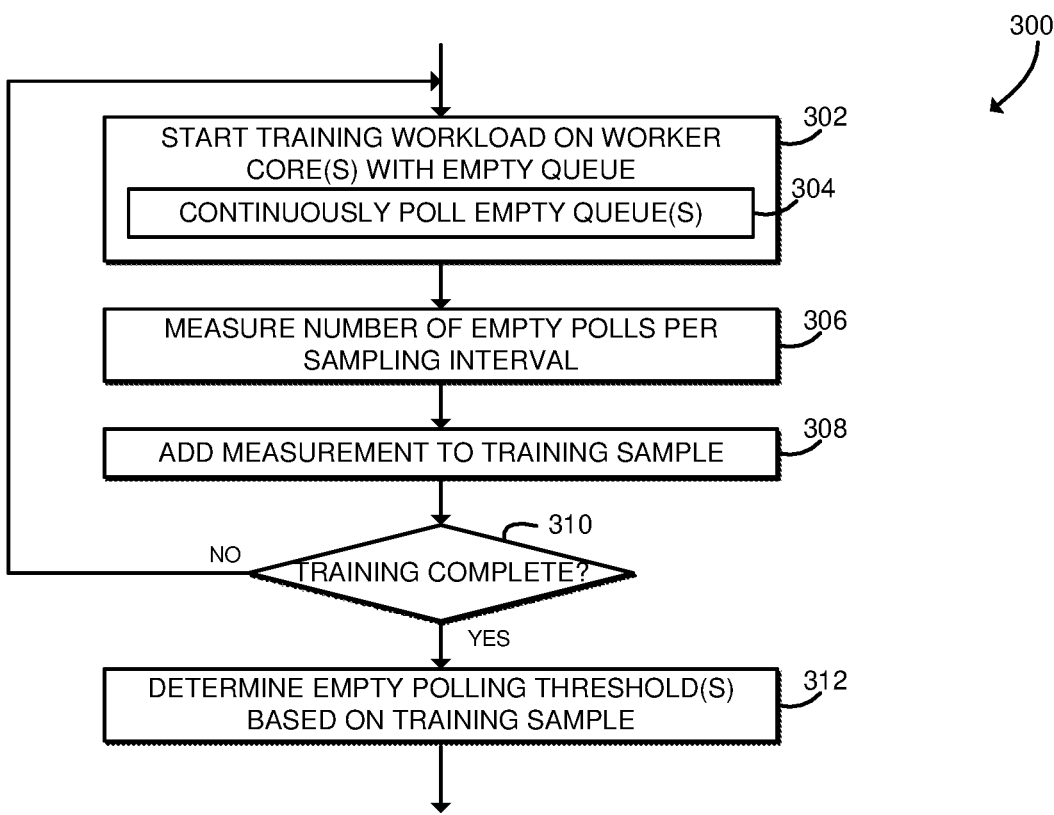
FIG. 3 is a simplified flow diagram of at least one embodiment of a method for empty polling performance training that may be executed by the computing device of FIGS. 1-2.

Referring now to FIG. 3, in use, the computing device 102 may execute a method 300 for empty polling performance training. It should be appreciated that, in some embodiments, the operations of the method 300 may be performed by one or more components of the environment 200 of the computing device 102 as shown in FIG. 2. The method 300 begins with block 302, in which the computing device 102 starts a training workload on one or more worker processor cores 122 using an empty queue. For example, the computing device 102 may execute a packet processing workload (e.g., a DPDK workload) with no input network traffic, resulting in empty input queues, or the computing device 102 may execute software running on a core polling a queue or any device-to-software queues. As part of the training workload, in block 304 the processor core 122 continuously polls the empty queue. The processor core 122 may, for example, perform a tight loop that polls the queue to determine whether it has any entries, determines that the queue is empty, records the empty poll (e.g., in a counter or other variable), and then immediately repeats the loop. As described above, the queue may be embodied as a queue from a NIC 132, a software queue in memory, or other queue. As the computing device 102 is loaded, the cost (e.g., processor cycles) for an empty poll may vary due to memory load latency and other factors. Thus, the training workload may be executed at runtime to ensure the determined cost of an empty poll is accurate. The training workload may be executed at intervals as work is on-going to allow for variation in max polls as the computing device 102 becomes loaded.

In block 306, the computing device 102 measures the number of empty polls performed per sampling interval. The computing device 102 may, for example, read a counter or other variable that is incremented every time the processor core 122 polls the empty queue during the sample interval. The length of the sample interval may vary between embodiments. Illustratively, in a software-based embodiment the sample interval may be 10 milliseconds (10 ms). In a hardware-based embodiment, the sample interval may be smaller (e.g., down to microsecond or nanosecond intervals), which may increase system response time as described further below. The measured number of empty polls during training represents a maximum number of empty polls that the computing device 102 may perform in a given power state (e.g., core 122 frequency or other power state) during the sample interval. The number of empty polls performed scales linearly across frequency bins (e.g., each 100 MHz)

for a core 122. In other words, the cost of an empty poll (e.g., processor cycles) is equal and is constant across a range of frequencies/power states.

In block 308, the computing device 102 adds the measurement to a training sample. In block 310, the computing device 102 determines whether training is complete. The computing device 102 may, for example, determine whether data for sufficient sampling intervals have been gathered, whether data for sufficient power states have been gathered, or other criteria. If the training is not completed, the method 300 loops back to block 302 to continue the training workload. If training is complete, the method 300 advances to block 312.

In block 312, the computing device 102 determines one or more empty polling thresholds based on the training samples. Each empty polling thresholds may represent a number of empty polls per sample interval that is associated with a particular load/power level for the processor core 122. For example, empty polling thresholds may indicate low load, medium load, high load, or overload conditions. As described further below in connection with FIG. 4, a low load threshold may indicate that the processor core 122 has processing headroom available and thus may be free to perform other work and/or to enter a lower power state. Similarly, a high load threshold or overload threshold (e.g., zero empty polls) may indicate that the processor core 122 is fully loaded and thus may enter a higher power state to accommodate the processor load. The polling thresholds may be learned. For example, e.g. when the number of empty polls is illustratively 10% of the trained value and packet loss is observed, a threshold may be set accordingly. In that illustrative example, a threshold may be set at 11% of the trained value being the overload threshold. After determining the empty polling thresholds, the method 300 is completed. The computing device 102 may use the empty polling thresholds to perform power management as described further below in connection with FIG. 4. As described above, the computing device 102 may continue to execute the method 300 at runtime in order to adapt or otherwise recalculate the empty polling thresholds.

Figure 4:
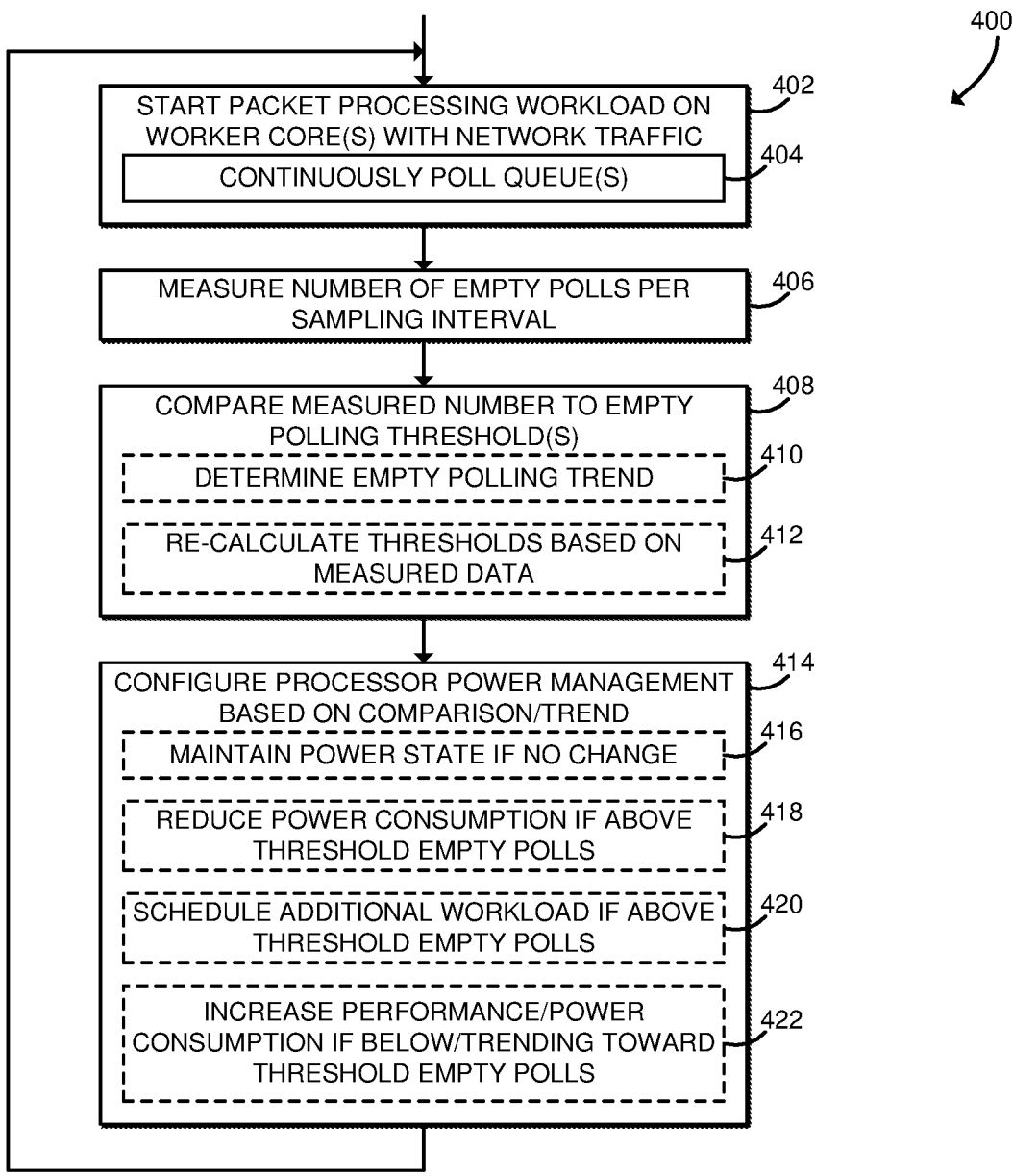
FIG. 4 is a simplified flow diagram of at least one embodiment of a method for power and performance management that may be executed by the computing device of FIGS. 1-2.

Referring now to FIG. 4, in use, the computing device 102 may execute a method 400 for power and performance management. The method 400 may be executed after completing empty polling training as described above in connection with FIG. 3. It should be appreciated that, in some embodiments, the operations of the method 400 may be performed by one or more components of the environment 200 of the computing device 102 as shown in FIG. 2. The method 400 begins with block 402, in which the computing device 102 starts a packet processing workload (e.g., a DPDK workload) on one or more worker processor cores 122. The packet processing workload may process network traffic that is supplied on one or more input queues. For example, the NIC 132 and/or the processor cores 122 may place network packet data in the input queues. Each input queue may be associated with a particular worker core 122. As part of the training workload, in block 404 each processor core 122 continuously polls the associated input queue. The processor core 122 may, for example, perform a tight loop that polls the queue to determine whether it has any entries. As described above, the queue may be embodied as a queue from a NIC 132, a software queue in memory, or other queue. If the queue has packet data, the processor core 122 performs one or more associated packet processing tasks and then immediately repeats the loop. If the queue is empty, the processor core 122 may record the empty poll (e.g., in a counter or other variable) and then immediately repeats the loop. Thus, the number of empty polls performed may depend on the volume of network traffic processed, the cost of each packet processing operation, or other factors.

In block 406, the computing device 102 measures the number of empty polls performed per sampling interval. The computing device 102 may, for example, read a counter or other variable that is incremented every time the processor core 122 polls the empty queue during the sample interval. As described above, the length of the sample interval may vary, and in the illustrative software-based embodiment the sample interval is 10 milliseconds. In a hardware-based embodiment, the sample interval may be smaller (e.g., down to microsecond or nanosecond intervals), which may increase system response time.

In block 408, the computing device 102 compares the number of empty polls to the empty polling thresholds. The computing device 102 may, for example, determine whether the number of empty polls is larger than a threshold, which indicates that processor core 122 load is lower than the level associated with the threshold. As another example, the computing device 102 may determine whether the number of empty polls is lower than a threshold, which indicates that processor core 122 load is higher than the level associated with the threshold. In some embodiments, in block 410 the computing device 102 may determine one or more empty polling trends. For example, the computing device 102 may determine a rate of change of the number of empty polls. The empty polling trends may also be used to compare to the empty polling thresholds. For example, the computing device 102 may determine whether the number of empty polls is trending toward a threshold. Continuing that example, the computing device 102 may determine whether the number of empty polls is decreasing, and whether the number of empty polls will reach a threshold (e.g., zero) within a certain time period (e.g., a sampling interval). In some embodiments, in block 412 the computing device 102 may re-calculate the empty polling thresholds based on measured data. For example, as described above in connection with FIG. 3, the computing device 102 may continue to perform training workloads in order to adapt or otherwise recalculate the empty polling thresholds.

In block 414, the computing device 102 configures processor 120 power management based on the comparison to the empty polling thresholds and/or the empty polling trends. The computing device 102 may configure the processor cores 122 based on current core load as indicated by the number of empty polls per interval. In some embodiments, in block 416 the computing device 102 may maintain the current power state if no change is needed. For example, if the number of empty polls is within a high load and low load threshold, the current power state may be maintained. In some embodiments, in block 418 the computing device 102 may reduce power consumption if the number of empty polls is above a low load threshold, indicating the processor core 122 has available headroom. The computing device 102 may adjust processor power states (p-states), deactivate processor cores 122, or otherwise reduce power consumption of the processor 120. In some embodiments, in block 420 the computing device 102 may schedule additional workloads on the processor cores 122 if the number of empty polls is above a low load threshold, indicating the processor core 122 has available headroom. Scheduling the additional workload may use the available headroom of the processor core 122, which may improve overall efficiency of the computing device 102. In some embodiments, in block 422 the computing device 102 may increase performance/power consumption if the number of empty polls is below or trending toward a high load threshold, indicating the processor core 122 is under load. The computing device 102 may adjust processor power states (p-states), activate processor cores 122, or otherwise increase power consumption of the processor 120. After configuring the power management, the method 400 loops back to block 402 to continue performing the packet processing workload.

Figure 5:
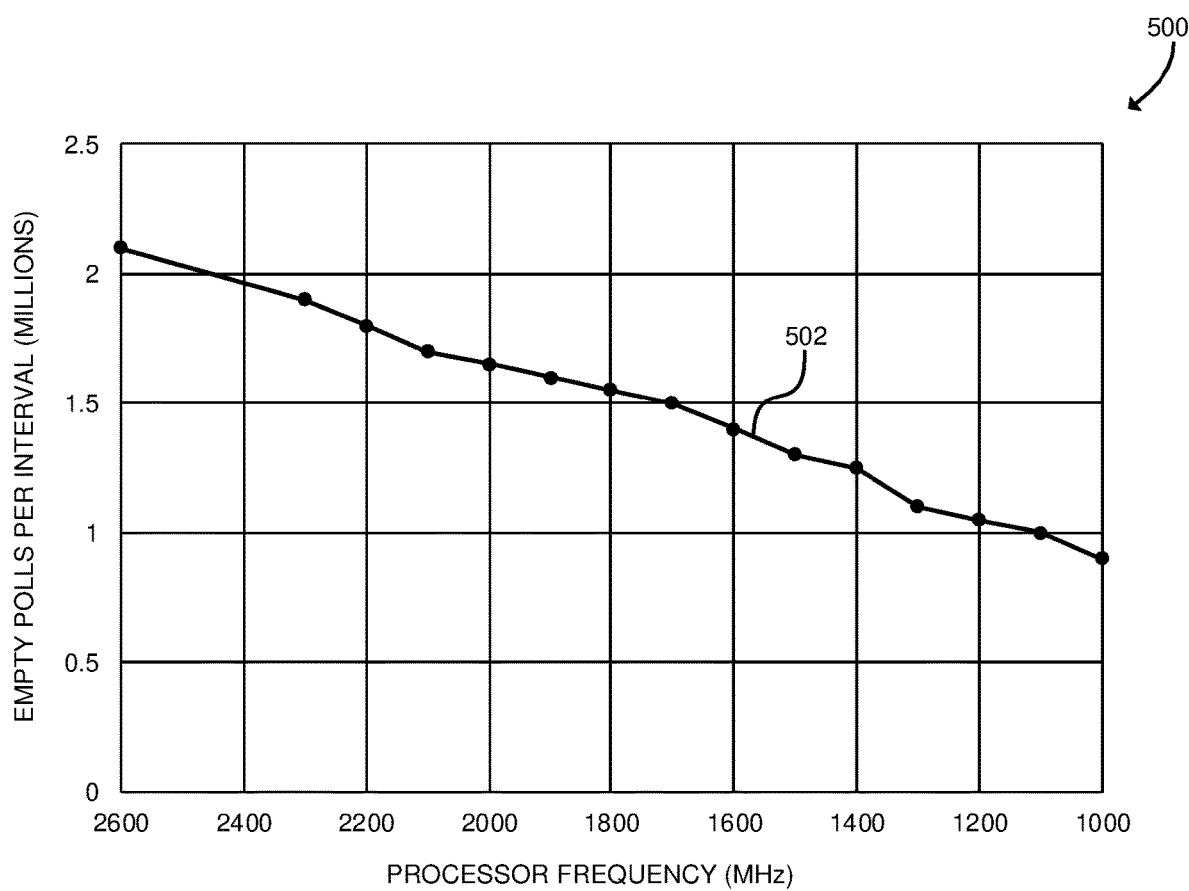
FIG. 5 is a chart illustrating empty polls per interval against processor frequency for no network traffic.

Referring now to FIG. 5, chart 500 illustrates empty polls per interval against processor frequency for an empty input queue (e.g., no network traffic). The chart 500 may illustrate training results determined using a training workload as described above in connection with FIG. 3. As shown by curve 502, at a high core frequency (2600 MHz), the core 122 performs more than two million empty polls per interval (10 ms). At a low core frequency (1000 MHz), the core 122 performs less than one million empty polls per interval. As shown, the number of polls per interval scales linearly across frequency bins (e.g., each 100 MHz). The curve 502 illustrates the maximum number of empty polls that may be performed at each core frequency, and thus may be used to determine "idleness." The curve 502 may be used to determine empty polling thresholds as described above in connection with FIG. 3. For example, the number of empty polls approaching the maximum for the current frequency may indicate idleness and the associated core 122 may be powered down. Similarly, the number of empty polls approaching zero may indicate that the core 122 is fully loaded and the core 122 may be powered up.

Figure 6:
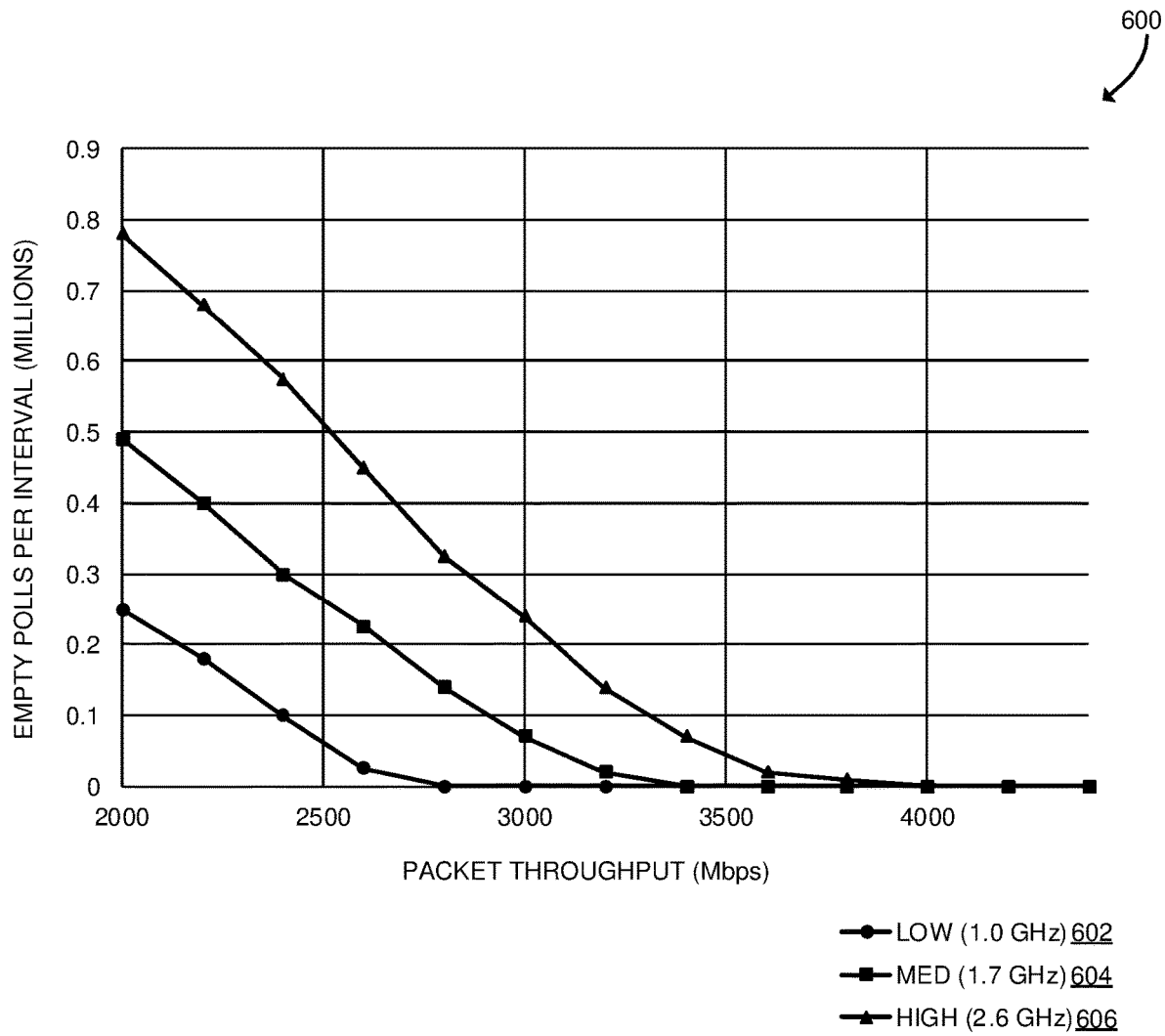
FIG. 6 is a chart illustrating empty polls per interval against network throughput for various processor frequencies.

Referring now to FIG. 6, chart 600 illustrates empty polls per interval against network throughput for various core frequencies. Curve 602 shows empty polls per interval for a low core frequency of 1.0 GHz, curve 604 shows empty polls per interval for a medium core frequency of 1.7 GHz, and curve 606 shows empty polls per interval for a high core frequency of 2.6 GHz. As shown, as the network packet processing load increases (shown in Mbps of network traffic), the empty poll count decreases. As the number of empty polls converges to zero, the core 122 becomes fully loaded, resulting in packet loss. Thus, by monitoring empty poll counts and trends, this overload condition may be predicted.

Each core frequency state converges to zero at a different amount of throughput. Thus, the empty polls per interval may be used to make decisions for frequency/power/performance scaling of the cores 122. In some embodiments, as the number of empty polls per interval converges on zero, the computing device 102 may increase the power state of the associated cores 122 (e.g., by increasing frequency from 1.0 GHz to 1.7 GHz, or from 1.7 GHz to 2.6 GHz). As an illustrative example, consider a core 122 that is initially in the 1.0 GHz power state that is processing an increasing amount of network traffic. In the illustrative example, the curve 602 (associated with the 1.0 GHz power state) reaches zero at about 2600 Mbps. Increasing the power state of the associated core 122 to 1.7 GHz jumps to the curve 604, resulting in about 0.15 million empty polls. Continuing that example, the curve 604 then reaches zero at about 3500 Mbps. Increasing the power state of the core 122 to 2.6 GHz jumps to the curve 606, resulting in about 0.08 million empty polls. The curve 606 then reaches zero at about 4000 Mbps, which may be the maximum throughput that may be processed by the particular core 122.

Similarly, in some embodiments, as the number of empty polls increases above a low load threshold, the computing device 102 may decrease the power state of the associated cores 122 (e.g., by decreasing frequency from 2.6 GHz to 1.7 GHz, or from 1.7 GHz to 1.0 GHz). As an illustrative example, consider a core 122 that is initially in the 2.6 GHz power state and is processing about 4000 Mbps of network traffic. As shown by the curve 606 and described above, the core 122 may be fully loaded in in this circumstance. Continuing the example, consider that network traffic is reduced to 2000 Mbps. As shown by curve 606, the number of empty polls increases to about 0.77 million empty polls. This amount of empty polls may be above a low load threshold, and the power state of the core 122 may be reduced to 1.7 GHz, which jumps to curve 604. As shown by curve 604, the 1.7 GHz power state with 2000 Mbps of network traffic results in about 0.5 million empty polls. This amount of empty polls may also be above the low load threshold, and the power state of the core 122 may be further reduced to 1.0 GHz, which jumps to curve 602. As shown by curve 602, the 1.0 GHz power state with 2000 Mbps of network traffic results in about 0.25 million empty polls. Thus, as shown, the computing device 102 may adjust processor power consumption and performance based on empty polling values.

It should be appreciated that, in some embodiments, the methods 300 and/or 400 may be embodied as various instructions stored on a computer-readable media, which may be executed by the processor 120, the I/O subsystem 124, the NIC 132, peripheral devices 134, and/or other components of the computing device 102 to cause the computing device 102 to perform the respective method 300 and/or 400. The computer-readable media may be embodied as any type of media capable of being read by the computing device 102 including, but not limited to, the memory 126, the data storage device 128, firmware devices, other memory or data storage devices of the computing device 102, portable media readable by a peripheral device 134 of the computing device 102, and/or other media.

Examples

Illustrative examples of the technologies disclosed herein are provided below. An embodiment of the technologies may include any one or more, and any combination of, the examples described below.

Example 1 includes a computing device for performance monitoring, the computing device comprising a polling trainer to (i) perform an empty polling training workload by a processor core of the computing device and (ii) determine one or more empty polling thresholds in response to performing the empty polling training workload, wherein each empty polling threshold is indicative of a number of empty polls per sampling interval; a packet processor to perform a packet processing workload on network traffic with one or more processor cores of the computing device in response to a determination of the one or more empty polling thresholds; and a power configuration manager to (i) compare a first number of empty polls by the packet processing workload to the one or more empty polling thresholds in response to performance of the packet processing workload and (ii) configure power management of the one or more processor cores in response to a comparison of the first number of empty polls to the one or more empty polling thresholds.

Example 2 includes the subject matter of Example 1, and wherein to perform the packet processing workload comprises to continuously poll, by a processor core of the computing device, an input queue associated with the network traffic; and measure the first number of empty polls per sampling interval performed on the input queue associated with the network traffic.

Example 3 includes the subject matter of any of Examples 1 and 2, and wherein to perform the empty polling training workload comprises to perform, by the processor core, the packet processing workload with an empty input queue, wherein to perform the packet processing workload comprises to continuously poll the empty input queue; and measure a second number of empty polls per sampling interval in response to performance of the packet processing workload, wherein the second number of empty polls is indicative of a number of polls performed on the empty input queue.

Example 4 includes the subject matter of any of Examples 1-3, and wherein to determine the one or more empty polling thresholds comprises to determine the one or more empty polling thresholds based on the second number of empty polls.

Example 5 includes the subject matter of any of Examples 1-4, and wherein the power configuration manager is further to determine an empty polling trend in response to measurement of the second number of empty polls; and to compare the first number of empty polls to the one or more empty polling thresholds comprises to compare the first number of empty polls and the empty polling trend to the one or more empty polling thresholds.

Example 6 includes the subject matter of any of Examples 1-5, and wherein to determine the empty polling trend comprises to determine whether the first number of empty polls trends toward zero; and to configure the power management comprises to increase a performance level of the one or more processor cores in response to a determination that the first number of empty polls trends toward zero.

Example 7 includes the subject matter of any of Examples 1-6, and wherein to compare the first number of empty polls to the one or more empty polling thresholds comprises to determine whether the first number of empty polls is greater than an empty polling threshold; and to configure the power management comprises to decrease a performance level of the one or more processor cores in response to a determination that the first number of empty polls is greater than an empty polling threshold.

Example 8 includes the subject matter of any of Examples 1-7, and wherein to decrease the performance level comprises to decrease a processor power state of a processor core or to deactivate a processor core.

Example 9 includes the subject matter of any of Examples 1-8, and wherein to compare the first number of empty polls to the one or more empty polling thresholds comprises to determine whether the first number of empty polls is less than an empty polling threshold; and to configure the power management comprises to increase a performance level of the one or more processor cores in response to a determination that the first number of empty polls is greater than an empty polling threshold.

Example 10 includes the subject matter of any of Examples 1-9, and wherein to increase the performance level comprises to increase a processor power state of a processor core or to activate a processor core.

Example 11 includes the subject matter of any of Examples 1-10, and wherein to compare the first number of empty polls to the one or more empty polling thresholds comprises to determine whether the first number of empty polls is greater than an empty polling threshold; and to configure the power management comprises to schedule an additional workload on the one or more processor cores in response to a determination that the first number of empty polls is greater than an empty polling threshold.

Example 12 includes the subject matter of any of Examples 1-11, and wherein each of the one or more polling thresholds is associated with a level of packet processing load.

Example 13 includes a method for performance monitoring, the method comprising performing, by a computing device, an empty polling training workload by a processor core of the computing device; determining, by the computing device, one or more empty polling thresholds in response to performing the empty polling training workload, wherein each empty polling threshold is indicative of a number of empty polls per sampling interval; performing, by the computing device, a packet processing workload on network traffic by one or more processor cores of the computing device in response to determining the one or more empty polling thresholds; comparing, by the computing device, a first number of empty polls by the packet processing workload to the one or more empty polling thresholds in response to performing the packet processing workload; and configuring, by the computing device, power management of the one or more processor cores in response to comparing the first number of empty polls to the one or more empty polling thresholds.

Example 14 includes the subject matter of Example 13, and wherein performing the packet processing workload comprises continuously polling, by a processor core of the computing device, an input queue associated with the network traffic; and measuring, by the computing device, the first number of empty polls per sampling interval performed on the input queue associated with the network traffic.

Example 15 includes the subject matter of any of Examples 13 and 14, and wherein performing the empty polling training workload comprises performing, by the processor core, the packet processing workload with an empty input queue, wherein performing the packet processing workload comprises continuously polling the empty input queue; and measuring, by the computing device, a second number of empty polls per sampling interval in response to performing the packet processing workload, wherein the second number of empty polls is indicative of a number of polls performed on the empty input queue.

Example 16 includes the subject matter of any of Examples 13-15, and wherein determining the one or more empty polling thresholds comprises determining the one or more empty polling thresholds based on the second number of empty polls.

Example 17 includes the subject matter of any of Examples 13-16, and further including determining, by the computing device, an empty polling trend in response to measuring the second number of empty polls; wherein comparing the first number of empty polls to the one or more empty polling thresholds comprises comparing the first number of empty polls and the empty polling trend to the one or more empty polling thresholds.

Example 18 includes the subject matter of any of Examples 13-17, and wherein determining the empty polling trend comprises determining whether the first number of empty polls trends toward zero; and configuring the power management comprises increasing a performance level of the one or more processor cores in response to determining that the first number of empty polls trends toward zero.

Example 19 includes the subject matter of any of Examples 13-18, and wherein comparing the first number of empty polls to the one or more empty polling thresholds comprises determining whether the first number of empty polls is greater than an empty polling threshold; and configuring the power management comprises decreasing a performance level of the one or more processor cores in response to determining that the first number of empty polls is greater than an empty polling threshold.

Example 20 includes the subject matter of any of Examples 13-19, and wherein decreasing the performance level comprises decreasing a processor power state of a processor core or deactivating a processor core.

Example 21 includes the subject matter of any of Examples 13-20, and wherein comparing the first number of empty polls to the one or more empty polling thresholds comprises determining whether the first number of empty polls is less than an empty polling threshold; and configuring the power management comprises increasing a performance level of the one or more processor cores in response to determining that the first number of empty polls is greater than an empty polling threshold.

Example 22 includes the subject matter of any of Examples 13-21, and wherein increasing the performance level comprises increasing a processor power state of a processor core or activating a processor core.

Example 23 includes the subject matter of any of Examples 13-22, and wherein comparing the first number of empty polls to the one or more empty polling thresholds comprises determining whether the first number of empty polls is greater than an empty polling threshold; and configuring the power management comprises scheduling an additional workload on the one or more processor cores in response to determining that the first number of empty polls is greater than an empty polling threshold.

Example 24 includes the subject matter of any of Examples 13-23, and wherein each of the one or more polling thresholds is associated with a level of packet processing load.

Example 25 includes a computing device comprising a processor; and a memory having stored therein a plurality of instructions that when executed by the processor cause the computing device to perform the method of any of Examples 13-24.

Example 26 includes one or more non-transitory, computer readable storage media comprising a plurality of instructions stored thereon that in response to being executed result in a computing device performing the method of any of Examples 13-24.

Example 27 includes a computing device comprising means for performing the method of any of Examples 13-24.

The invention claimed is:

1. A computing device for performance monitoring, the computing device comprising:
polling training circuitry to (i) perform an empty polling training workload by a processor core of the computing device, the empty polling training workload based on an empty input queue and (ii) determine one or more empty polling thresholds in response to performing the empty polling training workload, respective empty polling thresholds indicative of a number of empty polls per sampling interval;
packet processing circuitry to perform a packet processing workload on network traffic with the processor core of the computing device; and
power configuration managing circuitry to:
determine an empty polling trend in response to measurement of a second number of empty polls;
compare a first number of empty polls by the packet processing workload to the one or more empty polling thresholds in response to performance of the packet processing workload, by comparing the first number of empty polls and the empty polling trend to the one or more empty polling thresholds;
cause a power adjustment of the processor core in response to a comparison of the first number of empty polls to the one or more empty polling thresholds.

2. The computing device of claim 1, wherein the packet processing circuitry is to:
cause the processor core of the computing device to continuously poll an input queue associated with the network traffic; and
measure the first number of empty polls per sampling interval performed on the input queue associated with the network traffic.

3. The computing device of claim 1, wherein the polling training circuitry is to:
cause the processor core to perform the packet processing workload with the empty input queue, the packet processing circuitry to perform the packet processing workload by continuously polling the empty input queue; and
the packet processing circuitry to measure the second number of empty polls per sampling interval in response to performance of the packet processing workload, wherein the second number of empty polls is indicative of a number of polls performed on the empty input queue.

4. The computing device of claim 3, wherein the polling training circuitry is to determine the one or more empty polling thresholds by determining the one or more empty polling thresholds based on the second number of empty polls.

5. The computing device of claim 1, wherein the power configuration managing circuitry is to:
compare the first number of empty polls to the one or more empty polling thresholds by determining whether the first number of empty polls is greater than one of the one or more empty polling thresholds; and
configure the power management by scheduling an additional workload on the processor core in response to a determination that the first number of empty polls is greater than one of the one or more empty polling thresholds.

6. The computing device of claim 1, wherein:
the polling training circuitry is to determine the empty polling trend by determining whether the first number of empty polls trends toward zero; and
the power configuration managing circuitry is to increase a performance level of the one or more processor cores in response to a determination that the first number of empty polls trends toward zero.

7. The computing device of claim 1, wherein the power configuration managing circuitry is to:
compare the first number of empty polls to the one or more empty polling thresholds by determining whether the first number of empty polls is greater than one of the one or more empty polling thresholds; and
configure the power management by decreasing a performance level of the one or more processor cores in response to a determination that the first number of empty polls is greater than the one of the one or more empty polling thresholds.

8. The computing device of claim 7, wherein the power configuration managing circuitry is to decrease the performance level by decreasing a processor power state of the processor core or to deactivate the processor core.

9. The computing device of claim 1, wherein respective ones of the one or more polling thresholds are associated with a level of packet processing load.

10. A computing device to monitor performance comprising:
   polling training circuitry to (i) perform an empty polling training workload by a processor core of the computing device, the empty polling training workload based on an empty input queue and (ii) determine one or more empty polling thresholds in response to performing the empty polling training workload, respective empty polling thresholds indicative of a number of empty polls per sampling interval;
   packet processing circuitry to perform a packet processing workload on network traffic with the processor core of the computing device; and
   power configuration managing circuitry to:
      compare a first number of empty polls by the packet processing workload to the one or more empty polling thresholds in response to performance of the packet processing workload, the comparison to determine whether the first number of empty polls is less than one of the one or more empty polling thresholds; and
      cause a power adjustment of the processor core in response to the comparison of the first number of empty polls to the one or more empty polling thresholds, the power adjustment to increase a performance level of the processor core in response to a determination that the first number of empty polls is greater than one of the one or more empty polling thresholds.

11. The computing device of claim 10, wherein the power configuration managing circuitry is to increase the performance level by increasing a processor power state of the processor core or to activate the processor core.

12. A method for performance monitoring, the method comprising:
   performing, by a computing device, an empty polling training workload by a first one of one or more processor cores of the computing device, the empty polling training workload based on an empty input queue;
   determining, by the computing device, one or more empty polling thresholds in response to performing the empty polling training workload, wherein respective ones of the empty polling threshold are indicative of a number of empty polls per sampling interval;
   performing, by the computing device, a packet processing workload on network traffic by second ones of the one or more processor cores of the computing device in response to determining the one or more empty polling thresholds;
   comparing, by the computing device, a first number of empty polls by the packet processing workload to the one or more empty polling thresholds in response to performing the packet processing workload, the comparison determining whether the first number of empty polls is less than one of the one or more empty polling thresholds; and
   configuring, by the computing device, power management of the second ones of the one or more processor cores in response to comparing the first number of empty polls to the one or more empty polling thresholds, the performance level of the second ones of the one or more processor cores increased in response to determining that the first number of empty polls is greater than one of the one or more empty polling thresholds.

13. The method of claim 12, wherein:
   comparing the first number of empty polls to the one or more empty polling thresholds includes determining whether the first number of empty polls is less than one of the one or more empty polling thresholds; and
   configuring the power management includes increasing a performance level the second ones of the one or more processor cores in response to determining that the first number of empty polls is greater than the one of the one or more empty polling thresholds.

14. The method of claim 12, wherein performing the packet processing workload includes:
   continuously polling, by the first one of the one or more processor cores of the computing device, an input queue associated with the network traffic; and
   measuring, by the computing device, the first number of empty polls per sampling interval performed on the input queue associated with the network traffic.

15. The method of claim 12, further including:
   determining, by the computing device, an empty polling trend in response to measuring a second number of empty polls;
   wherein comparing the first number of empty polls to the one or more empty polling thresholds includes comparing the first number of empty polls and the empty polling trend to the one or more empty polling thresholds.

16. A method for performance monitoring comprising:
   performing, by a computing device, an empty polling training workload by a first one of one or more processor cores of the computing device, the empty polling training workload based on an empty input queue;
   determining, by the computing device, one or more empty polling thresholds in response to performing the empty polling training workload, respective ones of the empty polling thresholds indicative of a number of empty polls per sampling interval;
   performing, by the computing device, a packet processing workload on network traffic by second ones of the one or more processor cores of the computing device in response to determining the one or more empty polling thresholds;
   comparing, by the computing device, a first number of empty polls by the packet processing workload to the one or more empty polling thresholds in response to performing the packet processing workload, the comparing to determine whether the first number of empty polls is greater than the one of the one or more empty polling thresholds; and
   configuring, by the computing device, power management of the second ones of the one or more processor cores in response to comparing the first number of empty polls to the one or more empty polling thresholds, the configuring including scheduling an additional workload on the second ones of the one or more processor cores in response to determining that the first number of empty polls is greater than the one of the one or more empty polling thresholds.

17. A memory circuit comprising instructions stored thereon that, when executed, cause a computing device to at least:

perform an empty polling training workload by a first processor core of the computing device, the empty polling training workload based on an empty input queue;

determine one or more empty polling thresholds in response to performing the empty polling training workload, respective empty polling thresholds indicative of a number of empty polls per sampling interval;

perform a packet processing workload on network traffic by second ones of the one or more processor cores of the computing device in response to determining the one or more empty polling thresholds;

compare a first number of empty polls by the packet processing workload to the one or more empty polling thresholds by determining whether the first number of empty polls is greater than at least one of the one or more empty polling thresholds; and configure the power management by scheduling an additional workload on the second ones of the one or more processor cores in response to comparing the first number of empty polls to the one or more empty polling thresholds and determining that the first number of empty polls is greater than the at least one of the one or more empty polling thresholds.

18. A memory circuit comprising instructions stored thereon that, in response to being executed, cause a computing device to at least:

perform an empty polling training workload by a first processor core of the computing device, the empty polling training workload based on an empty input queue;

determine one or more empty polling thresholds in response to performing the empty polling training workload, respective empty polling thresholds indicative of a number of empty polls per sampling interval;

perform a packet processing workload on network traffic by second ones of one or more processor cores of the computing device in response to determining the one or more empty polling thresholds;

compare a first number of empty polls by the packet processing workload to the one or more empty polling thresholds in response to performing the packet processing workload;

determine an empty polling trend in response to measuring a second number of empty polls;

compare the first number of empty polls to the one or more empty polling thresholds by comparing the first number of empty polls and the empty polling trend to the one or more empty polling thresholds; and configure power management of the second ones of the or more processor cores in response to comparing the first number of empty polls to the one or more empty polling thresholds.

19. The memory circuit of claim 18, wherein the instructions, when executed, cause the computing device to:

compare the first number of empty polls to the one or more empty polling thresholds by determining whether the first number of empty polls is greater than an empty polling threshold; and configure the power management by decreasing a performance level of the second ones of the one or more processor cores in response to determining that the first number of empty polls is greater than an empty polling threshold.

20. The memory circuit of claim 18, wherein the instructions, when executed, cause the computing device to:

continuously poll, by the second ones of the one or more processor cores of the computing device, an input queue associated with the network traffic; and measure the first number of empty polls per sampling interval performed on the input queue associated with the network traffic.

21. The memory circuit of claim 18, wherein the instructions, when executed, cause the computing device to:

perform, by the second ones of the one or more processor cores, the packet processing workload with an empty input queue, wherein performing the packet processing workload includes continuously polling the empty input queue; and measure the second number of empty polls per sampling interval in response to performing the packet processing workload, wherein the second number of empty polls is indicative of a number of polls performed on the empty input queue.

22. The memory circuit of claim 18, wherein the instructions, when executed, cause the computing device to:

compare the first number of empty polls to the one or more empty polling thresholds by determining whether the first number of empty polls is less than at least one of the one or more empty polling thresholds; and configure the power management by increasing a performance level of the one or more processor cores in response to determining that the first number of empty polls is greater than at least one of the one or more empty polling thresholds.

* * * * *